(12) United States Patent
Stephenson, Jr.

(10) Patent No.: US 8,978,259 B1
(45) Date of Patent: Mar. 17, 2015

(54) VESSEL DOCKING GUIDANCE SYSTEM AND METHOD OF USE

(71) Applicant: Samuel S. Stephenson, Jr., Boca Raton, FL (US)

(72) Inventor: Samuel S. Stephenson, Jr., Boca Raton, FL (US)

( * ) Notice: Subject to any disclaimer, the term of this patent is extended or adjusted under 35 U.S.C. 154(b) by 213 days.

(21) Appl. No.: 13/766,533

(22) Filed: Feb. 13, 2013

Related U.S. Application Data

(60) Provisional application No. 61/633,489, filed on Feb. 13, 2012.

(51) Int. Cl.
    *G01B 11/27*     (2006.01)
    *G01B 11/28*     (2006.01)

(52) U.S. Cl.
    CPC ..................... *G01B 11/28* (2013.01)
    USPC ............................. 33/264; 33/286

(58) Field of Classification Search
    USPC ................... 33/228, 263, 264, 286, 613, 645, 33/DIG. 21
    See application file for complete search history.

(56) References Cited

U.S. PATENT DOCUMENTS

| | | | | |
|---|---|---|---|---|
| 5,331,745 | A * | 7/1994 | Jager | 33/DIG. 21 |
| 6,222,457 | B1 * | 4/2001 | Mills et al. | 33/264 |
| 7,043,342 | B1 * | 5/2006 | Dewees | 33/264 |
| 8,365,422 | B1 * | 2/2013 | Ott | 33/264 |
| 8,590,167 | B2 * | 11/2013 | Odom | 33/228 |
| 2011/0216199 | A1 * | 9/2011 | Trevino et al. | 33/264 |
| 2013/0037339 | A1 * | 2/2013 | Hickox | 33/264 |
| 2014/0283398 | A1 * | 9/2014 | Galyean | 33/228 |

* cited by examiner

*Primary Examiner* — G. Bradley Bennett
(74) *Attorney, Agent, or Firm* — Allen D. Hertz, P.A.; Allen D. Hertz

(57) ABSTRACT

A laser guidance docking system utilizes a guidance laser to emit and direct a laser beam towards a dock upper surface. A target marking or reference is located on the dock upper surface. A laser illuminated marking is created at the contact point of the laser beam upon the dock upper surface. The target marking is located at a longitudinal position along a length of the dock upper surface, wherein the target marking provides a reference to properly position the vessel at a longitudinal position along the dock. The laser guidance docking system can be enhanced by integrated a camera, a vertical dimension measurement device, and a laser vertical angle reference device. Information regarding the positional relationship between the laser illuminated marking and the target marking can be presented on a remote video display. The system can include a computing device to adapt for a vertical offset of the laser.

20 Claims, 14 Drawing Sheets

VESSEL DOCKING GUIDANCE SYSTEM AND METHOD OF USE

CROSS-REFERENCE TO RELATED APPLICATION

This application is a Non-Provisional Patent Application claming the benefit of U.S. Provisional Patent Application Ser. No. 61/633,489, filed on Feb. 13, 2012, which is incorporated herein in its entirety.

FIELD OF THE INVENTION

The present invention relates to a vessel docking guidance system, more specifically a laser directed guidance system using a laser beam to determine a repeatable alignment location of the vessel respective to a dock by aligning the laser beam with a marking system applied to an upper surface of the dock.

BACKGROUND OF THE INVENTION

In summary, a docking process of a large vessel can be tedious and time consuming. The operating costs of a ship or other large vessel can be as high as hundreds of dollars per minute. In addition to operating costs, the docking procedure generally requires an additional person standing on the dock to aid the captain (or other person overseeing operation of the vessel) in guiding the ship to a desired alignment with the dock. Cruise ships, for example, dock at a plurality of ports during each cruise. Excess minutes during each docking can add up to sizeable costs during each cruise. When docking large vessels, the process requires that the vessel be positioned longitudinally along the dock to properly position the ships bitts or other mooring equipment at a desired relation with the docks bitts, cleats, or other mooring equipment.

In more detail, many vessels call on the same port on a regular basis and berth at the same dock or wharf each time they arrive in the port.

In many instances for ships using the same dock on a regular basis, the final docking positioning of a vessel is critical and is virtually the same every time (within inches) in order for the ramps, chiksans (mechanical loading arms for oil tankers), gangway, side ports, cranes to be properly positioned for cargo operations or the skyway for the loading/unloading of passengers.

Currently, a vessel is spotted (positioned) by a harbormaster standing on the dock or a crewmember aboard the vessel to ensure the position of the chiksans, ramps, gangway(s) are correct. This is accomplished by the harbormaster walking up and down the dock or the crewmember walking the deck of the ship checking to ensure the line up of the ship's gangway, ramp, etc. are in proper position. This repetitive process, which is time consuming, is required to be done each time the ship berths even though the vessel is docking at the same berth over and over again and must be berthed within several inches of the predetermined position each time.

Currently, there is no accurate method to visually determine on the bridge of the ship if the vessel is in the proper fore and aft position for cargo operations, chiksans for tankers and/or the skyway used for embarking/disembarking passengers.

When a large vessel is docking and in position, it can be visually challenging on the bridge of the ship which can be 16 stories (approximately 170') above water to determine minimal fore and aft movement of the vessel when the lines are being put on the dock to secure the vessel. Many times during the docking evolution while lines are being put out, a vessel creeps either fore or aft and must be repositioned due to the virtually unnoticeable fore and aft motion from the bridge several stories high.

The current method of determining the fore and aft movement of a ship is done by eye by horizontally aligning two fixed objects on land to determine fore and aft motion or by using a Doppler speed log and looking at a computer screen to determine the numerical fore and aft motion.

The problem with aligning two fixed objects on land to determine fore/aft movement is that the person's head must remain stationary and eyes fixed on the two objects to determine fore/aft motion accurately. Once the eyes or head move the original reference point is lost.

Doppler is very accurate, however it requires taking your eyes off the side of the vessel and looking at a computer screen. When docking a vessel, the prudent person in charge of maneuvering the vessel is looking down the side of the vessel to monitor the lateral motion, fore/aft motion and the ships lines going out as well to ensure they do not get too taught by the fore/aft motion and part.

During the docking of a vessel, the fore and aft motion of the vessel is currently determined visually by aligning fixed objects on land perpendicular to the vessel. The other alternative is using a Doppler docking system, which is an electronic device that gives the longitudinal and lateral speed of the vessel toward or away from the dock and alongside the dock. The information displayed on the Doppler docking system is displayed on a computer screen and does not provide any visual reference.

At the present time, there is no visual aid available to help determine the fore and aft motion of a vessel alongside the dock or wharf and/or the correct docking position of a vessel which berths at the same dock on a regular basis.

Accordingly, there remains a need in the art for a docking guidance system that enables the ship's controlling officer the ability to quickly, easily, and adequately position a vessel in a precise aligned location respective to a length of a dock.

SUMMARY OF THE INVENTION

The present invention overcomes the deficiencies of the known art by disclosing an apparatus, a system, and a method of using a laser to aid in properly positioning a vessel longitudinally along a dock.

In accordance with one embodiment of the present invention, the invention consists of a method of properly positioning a vessel longitudinally along a dock, the method comprising steps of:

directing a laser towards a dock, wherein the laser is located at a predetermined position on the vessel and the dock comprises one of a marking and a series of markings;

determining which of the one of the marking and the series of markings positions the vessel in the proper longitudinal position along the dock; and propelling the ship longitudinally along the dock until an illuminated point generated by an end of a laser beam generated by the laser aligns with the determined one of the marking and the series of markings.

In accordance with an enhanced embodiment of the present invention, the invention consists of a method of properly positioning a vessel longitudinally along a dock, the method comprising steps of:

directing a guidance laser towards a dock, wherein the laser is located at a predetermined position on the vessel and the dock comprises one of:

an alignment marking, a series of alignment markings, and
an alignment object;
determining a target marking, wherein the target marking is selected from one of the an alignment marking, the series of alignment markings, and the alignment object and the target marking is a reference location used in conjunction with a guidance laser illuminated point to position the vessel in the proper longitudinal position along the dock;
emitting a guidance laser beam from the guidance laser, wherein the guidance laser beam is directed in a generally downward direction; and
propelling the ship longitudinally along the dock until the guidance laser illuminated point generated by an end of a guidance laser beam generated by the guidance laser aligns with the target marking.

In one aspect, the laser is retained by a pivotally assembly, enabling the laser to remain in a generally vertical orientation independent of the vessel's orientation.

In another aspect, the laser is retained by a pivoting gimbal assembly, wherein the gimbal assembly enables the laser to remain in a generally vertical orientation independent of the vessel's orientation.

In yet another aspect, the laser is retained by a pivoting ball joint assembly, wherein the ball joint assembly enables the laser to remain in a generally vertical orientation independent of the vessel's orientation.

In yet another aspect, the laser is retained by a pivoting combination of a ball joint and a gimbal assembly, wherein the combined ball joint and a gimbal assembly enables the laser to remain in a generally vertical orientation independent of the vessel's orientation.

In yet another aspect, the pivoting gimbal assembly further comprises a series of springs to retain the laser in central alignment with a housing.

In yet another aspect, the laser is retained within a laser enclosure.

In yet another aspect, the laser further comprises a camera to obtain an image of the relationship of the laser beam display and the alignment marker on the dock.

In yet another aspect, the laser system comprises a vertical correction system, wherein the vertical correction system comprises a vertical reference device attached to the laser, a height measurement device attached to the laser, and a computing device to determine an angular offset of the laser from vertical and a distance between the laser pivot location and the laser imaging surface; then calculating the horizontal offset of the laser beam location resulting from the angular offset.

In yet another aspect, the laser system comprises a visual output, wherein the visual output is presented on a system display. The visual output can display the actual laser beam location, the calculated corrected laser beam location, and the desired target reference. The display can additionally include a distance scale to aid in determining a remaining distance between the current vessel position and the target vessel position.

In yet another aspect, system data obtained from the laser assembly can be wirelessly transferred to a system control unit. The system data can include digital images, vertical angular offsets, laser to dock distance information, and the like.

In yet another aspect, the system can include a wireless receiver integrated into a system control unit. The system control unit can be installed within a bridge of the ship, portable for use by a pilot, tug boat operator, and the like, or both.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which.

Like reference numerals refer to like parts throughout the several views of the drawings.

DETAILED DESCRIPTION

Figure 1:
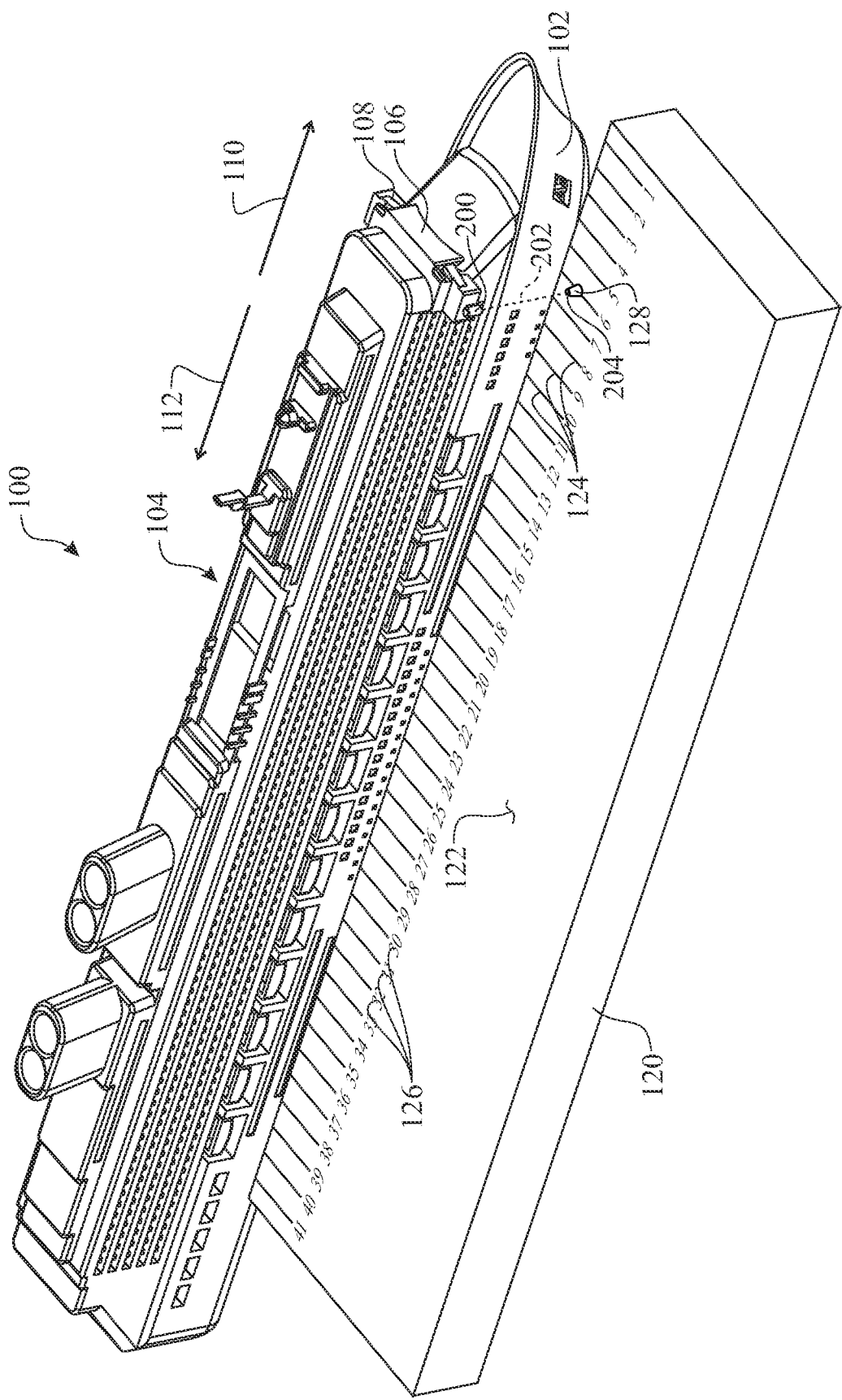
FIG. 1 presents an isometric view of an exemplary vessel utilizing an exemplary laser guidance docking system to precisely position the vessel longitudinally along a dock.
Figure 2:
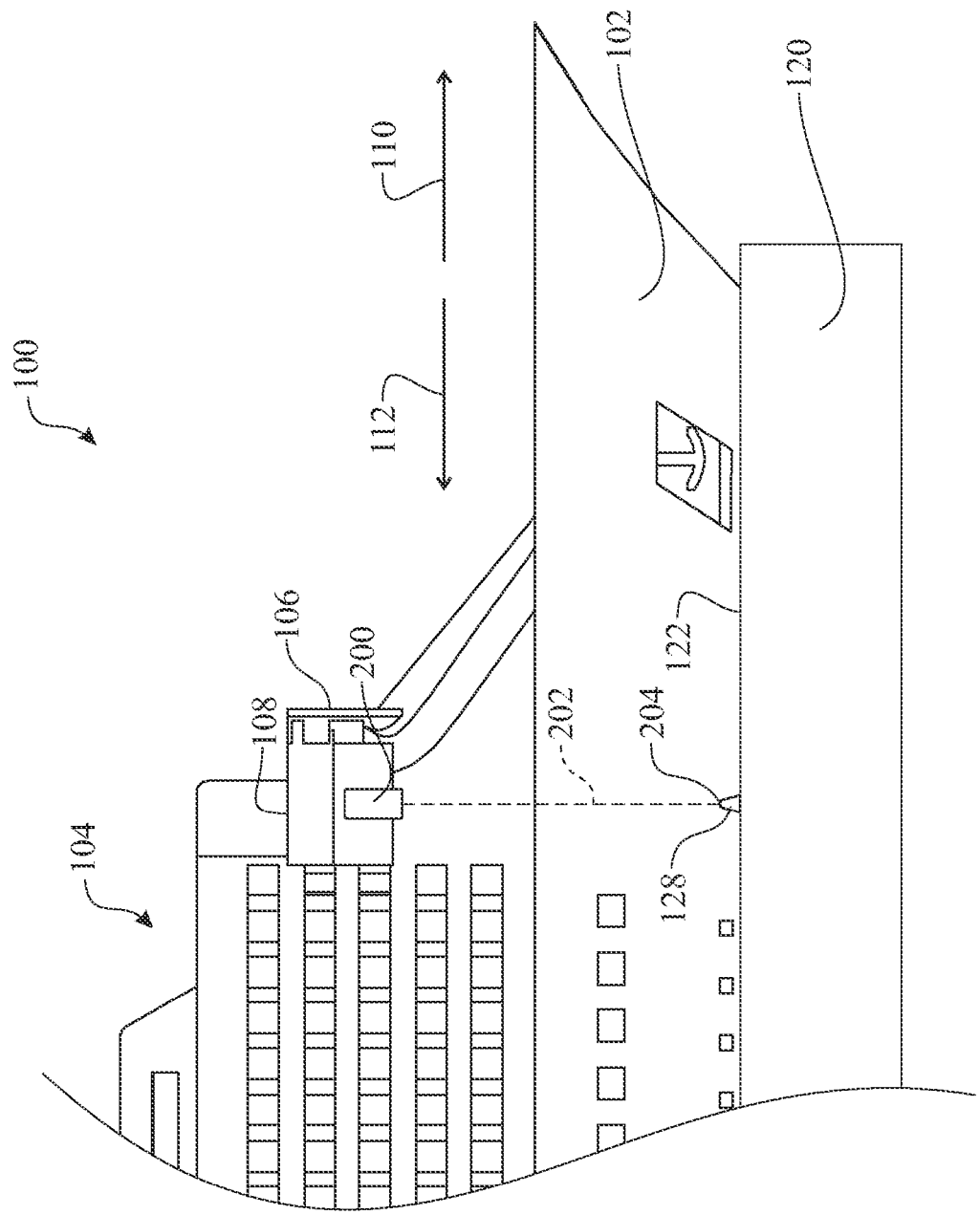
FIG. 2 presents a side elevation view of the vessel utilizing the exemplary laser guidance docking system as originally introduced in FIG. 1.
Figure 3:
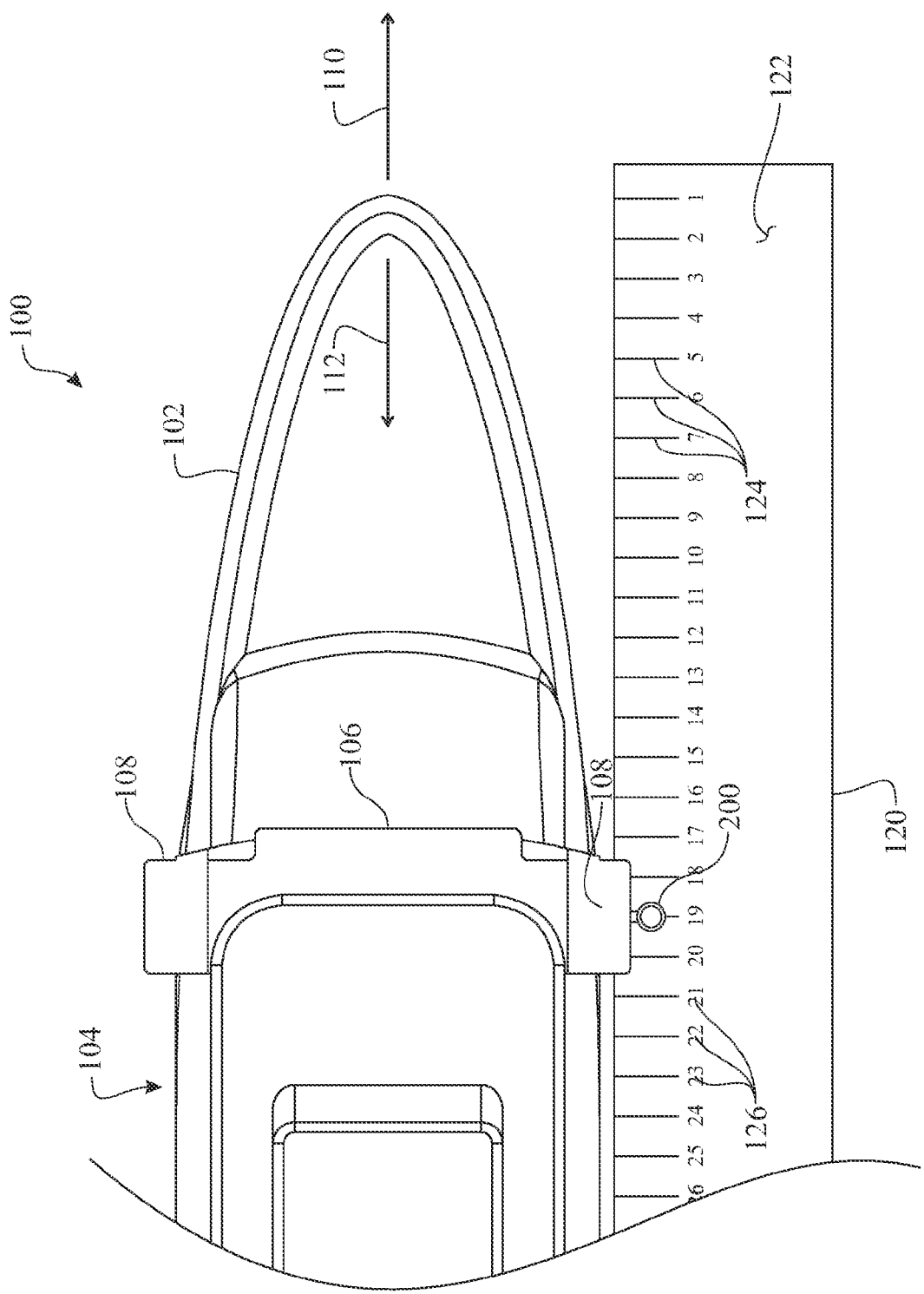
FIG. 3 presents a top plan view of the vessel utilizing the exemplary laser guidance docking system as originally introduced in FIG. 1.

Detailed embodiments of the present invention are disclosed herein. It will be understood that the disclosed embodiments are merely exemplary of the invention that may be embodied in various and alternative forms. The figures are not necessarily to scale, and some features may be exaggerated or minimized to show details of particular embodiments, features, or elements. Specific structural and functional details, dimensions, or shapes disclosed herein are not limiting but serve as a basis for the claims and for teaching a person of ordinary skill in the art the described and claimed features of embodiments of the present invention. The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

A docking process of a large vessel can be tedious and time consuming. The operating costs of a ship or other large vessel can be as high as hundreds of dollars per minute. In addition to operating costs, the docking procedure generally requires an additional person standing on the dock to aid the captain (or other person overseeing operation of the vessel) in guiding the ship to a desired alignment with the dock. Cruise ships, for example, dock at a plurality of ports during each cruise. Excess minutes during each docking can add up to sizeable costs during each cruise. When docking large vessels, the process requires that the vessel be positioned longitudinally along the dock to properly position the ships bitts or other mooring equipment at a desired relation with the docks bitts, cleats, or other mooring equipment.

Figure 4:
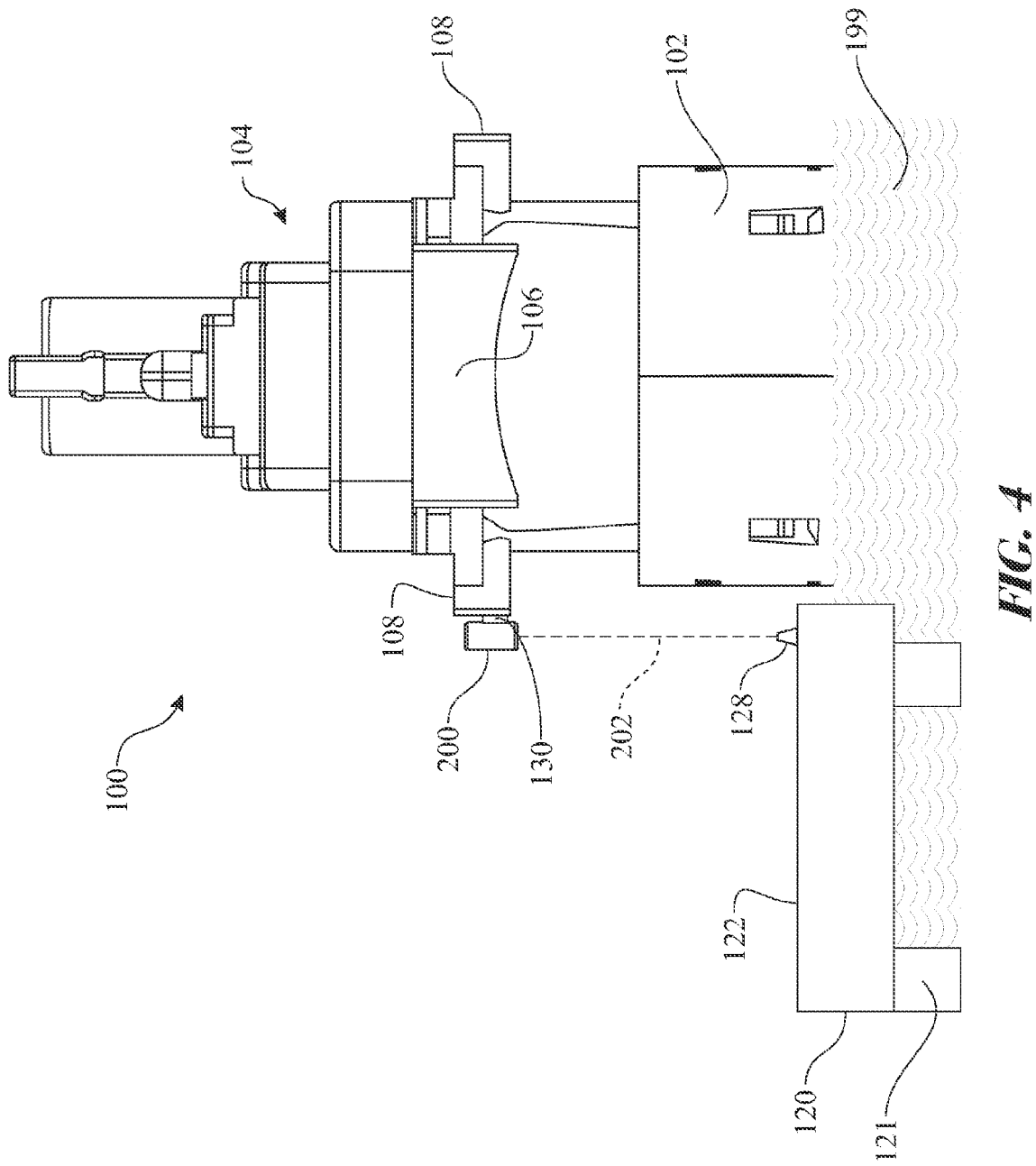
FIG. 4 presents a front (bow) elevation view of the vessel utilizing the exemplary laser guidance docking system as originally introduced in FIG. 1, wherein the laser guidance system is mounted to an exterior of the vessel superstructure.
Figure 5:
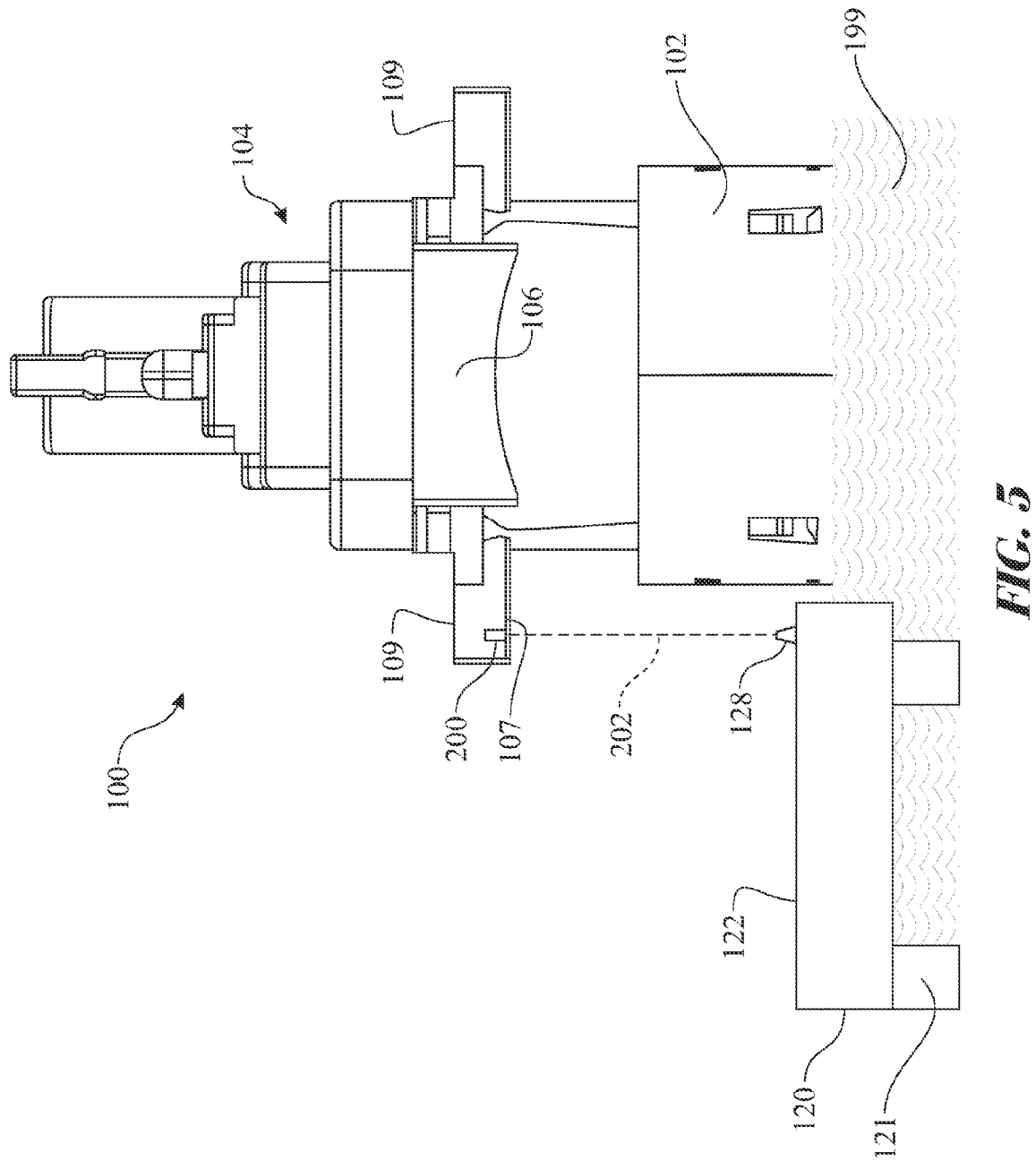
FIG. 5 presents a front (bow) elevation view of a vessel having wide bridge wings and utilizing a modified exemplary laser guidance docking system, wherein the laser guidance system is located within an interior of a bridge wing of the vessel.
Figure 6:
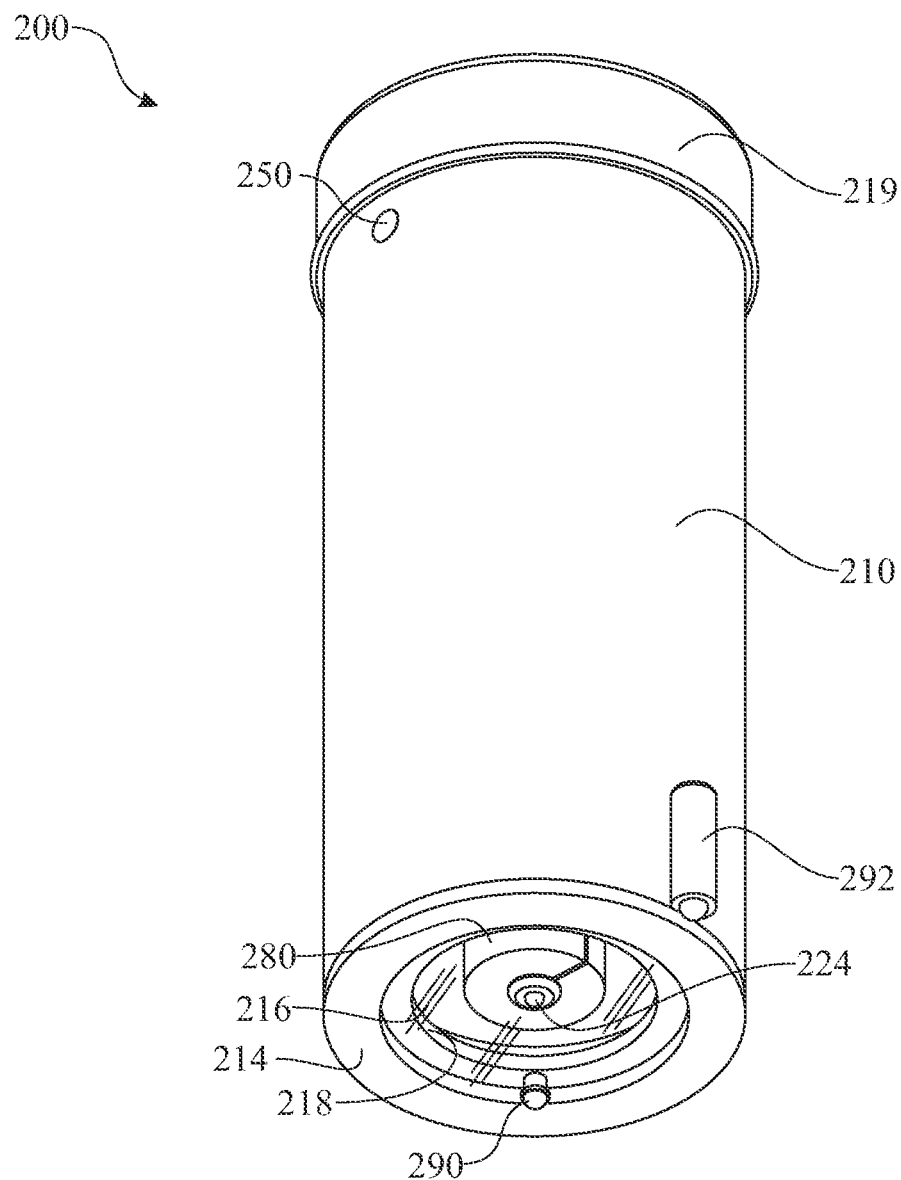
FIG. 6 presents an isometric bottom view of an exemplary laser guidance docking system.

The process is optimized by integrating a vessel laser positioning system 200 into a vessel 100, as illustrated in the exemplary embodiments presented in FIGS. 1 through 5. The vessel laser positioning system 200 can be attached to an exterior of the vessel 100 using a positioning system mount 130 as illustrated in FIGS. 1 through 4 or utilized within an extended bridge wing 109 as illustrated in FIG. 5.

The vessel 100 can be any sizeable vessel requiring assistance for longitudinal placement along a length of a dock platform 120. Although the exemplary vessel 100 is illustrated as a cruise ship, it is understood that the vessel 100 can be any ship, including a private yacht, a corporate yacht, a cargo ship, an oil tanker, a military ship, and the like.

The vessel 100 commonly includes a vessel superstructure 104, which extends upward from a vessel hull 102. A vessel bridge 106 is integrated into the vessel superstructure 104, wherein the vessel bridge 106 houses the ships navigation and operational control interfaces which are overseen by the ships operational controller and operation crew. Other elements of note that are shown in the illustrations include a body of water 199 and a dock supporting structure 121. The dock supporting structure 121 can include a seawall, a plurality of pilings, and the like.

The vessel laser positioning system 200 works in conjunction with a target marking located upon a dock upper surface 122 of the dock platform 120. The target marking can be provided in any suitable form factor. One exemplary marking is a location reference object 128. The location reference object 128 can be fixed to the dock upper surface 122 or placed by an operator when needed. The location reference object 128 can be a cone, a piling, and the like. A second exemplary marking is a single marking applied to the dock upper surface 122 of the dock platform 120. A third exemplary marking is a series of alignment markers 124 applied to the dock upper surface 122 of the dock platform 120. Each alignment marker 124 of the series of alignment markers 124 can be identified by an alignment marker reference 126. The alignment marker references 126 can be alphabetical, numeric, alphanumeric, a series of symbols, and the like. The vessel laser positioning system 200 emits a laser beam 202, which generates a laser illuminated marking 204. The vessel 100 moves in accordance with a fore motion 110 or an aft motion 112 until the laser illuminated marking 204 is aligned with the target marking.

The vessel laser positioning system 200 can be affixed to an exterior surface of the bridge wing 108 or any other suitable exterior surface of the vessel superstructure 104 by a positioning system mount 130 (FIG. 4). The vessel laser positioning system 200 is preferably located at a distance from a gunwale that extends sufficiently over the dock upper surface 122 of the dock platform 120. Certain vessels 100 include an extended bridge wing 109, as illustrated in FIG. 5, wherein the extended bridge wing 109 extends sufficiently beyond the gunwale of the vessel 100 to enable placement of the vessel laser positioning system 200 therein. The preferred design of the extended bridge wing 109 would include a bridge wing glass floor 107, which enables passage of the laser beam 202 therethrough. Alternatively, a transparent section can be inserted into a floor of the extended bridge wing 109 at the desired location of the vessel laser positioning system 200. In either case, the location of the vessel laser positioning system 200 must be repeatable Any motion of the vessel 100 can affect the vertical orientation of the laser beam 202. The vessel laser positioning system 200 can include features to compensate for any deviation from a vertical orientation. Details of the vessel laser positioning system 200 are presented in FIGS. 6 through 11. The vessel laser positioning system 200 includes a laser assembly 220 pivotally supported by a bi-directional gimbal assembly 230 and encased within an enclosure. The enclosure is preferably water-resistant or waterproof and includes a laser tubular enclosure 210 sealed at an upper end by an enclosure upper seal 219 and at a lower end by an enclosure lower seal 214. The enclosure lower seal 214 includes a lower seal central aperture 218 (which is covered by an enclosure laser window 216), wherein the lower seal central aperture 218 (and respective cover 216) enables passage of the laser beam 202 therethrough.

The pivotal support of the laser assembly 220 can be provided in any of a variety of form factors. The laser assembly 220 includes a guidance laser 222 having a laser lens 224 located at a beam emitting end thereof. The exemplary form factor includes a combination of a ball mount 226 and a bi-directional gimbal assembly 230. The guidance laser 222 can be any suitable laser pointer configuration, including a laser diode (preferably not to exceed 5 mW). The laser can be of any suitable wavelength, such as 635 nm (emitting a red colored beam), 532 nm (emitting a green colored beam), 445 nm (emitting a blue colored beam), 593.5 nm or 589 nm (emitting a yellow or golden colored beam), and the like. The system can include features to dissipate heat generated by the laser 222. The guidance laser 222 emits a laser beam 202 illuminating a point of interest with a small bright spot of colored light, referred to herein as a laser illuminated marking 204. The selection of the laser 222 should consider the legal restrictions in each country that the vessel 100 may moor at.

Figure 7:
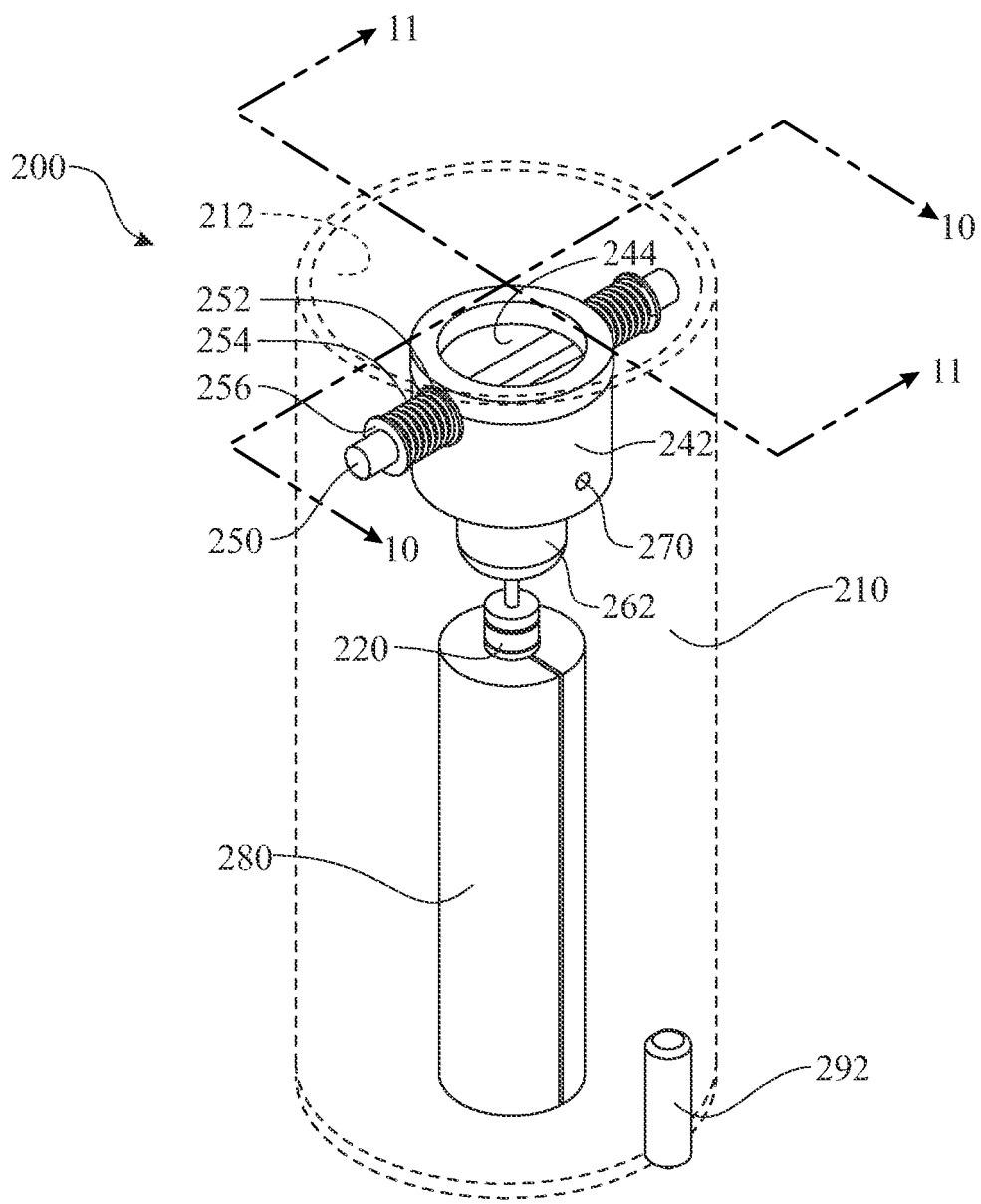
FIG. 7 presents an isometric top view of functional elements located within an interior of the exemplary laser guidance docking system originally introduced in FIG. 6.
Figure 8:
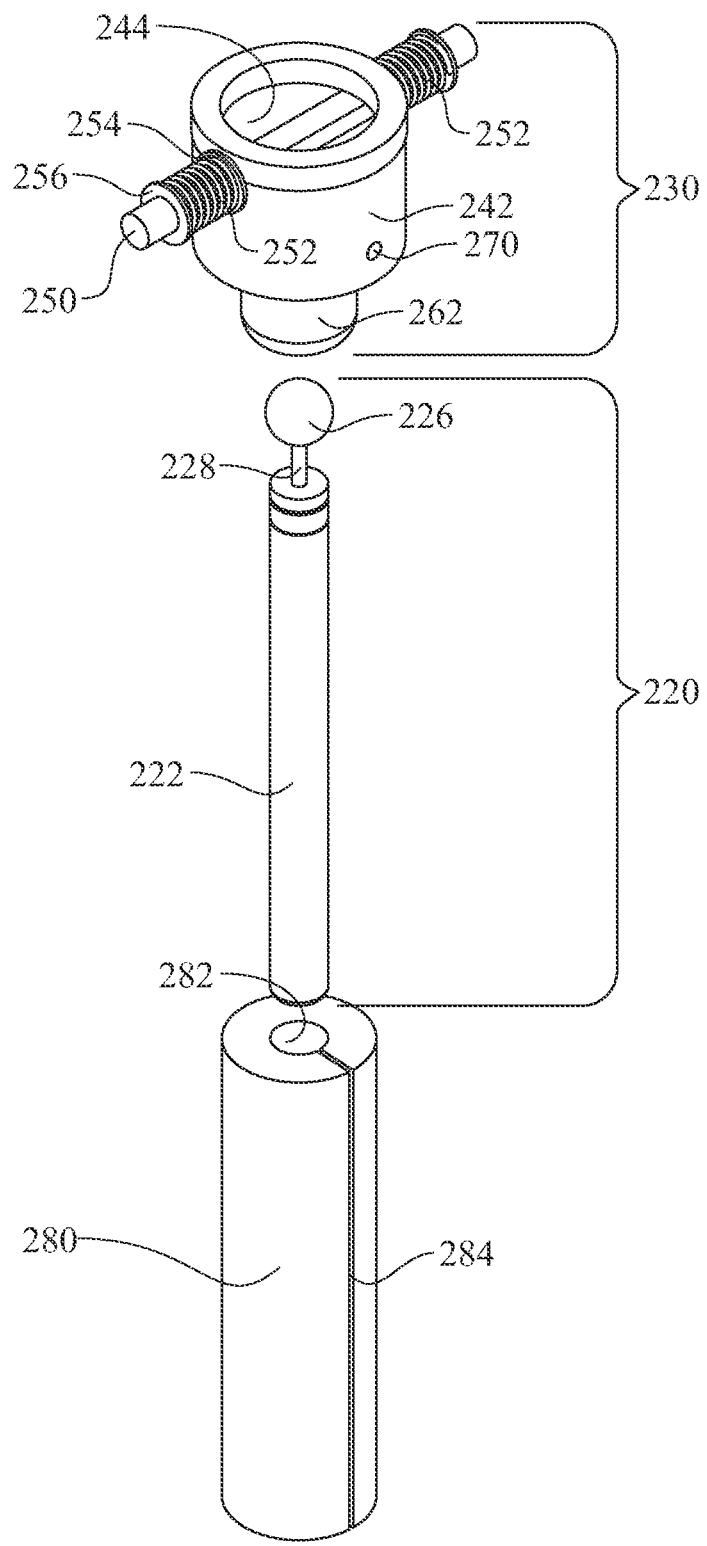
FIG. 8 presents an isometric partially exploded assembly view of the laser and mounting elements of the exemplary laser guidance docking system originally introduced in FIG. 6.
Figure 9:
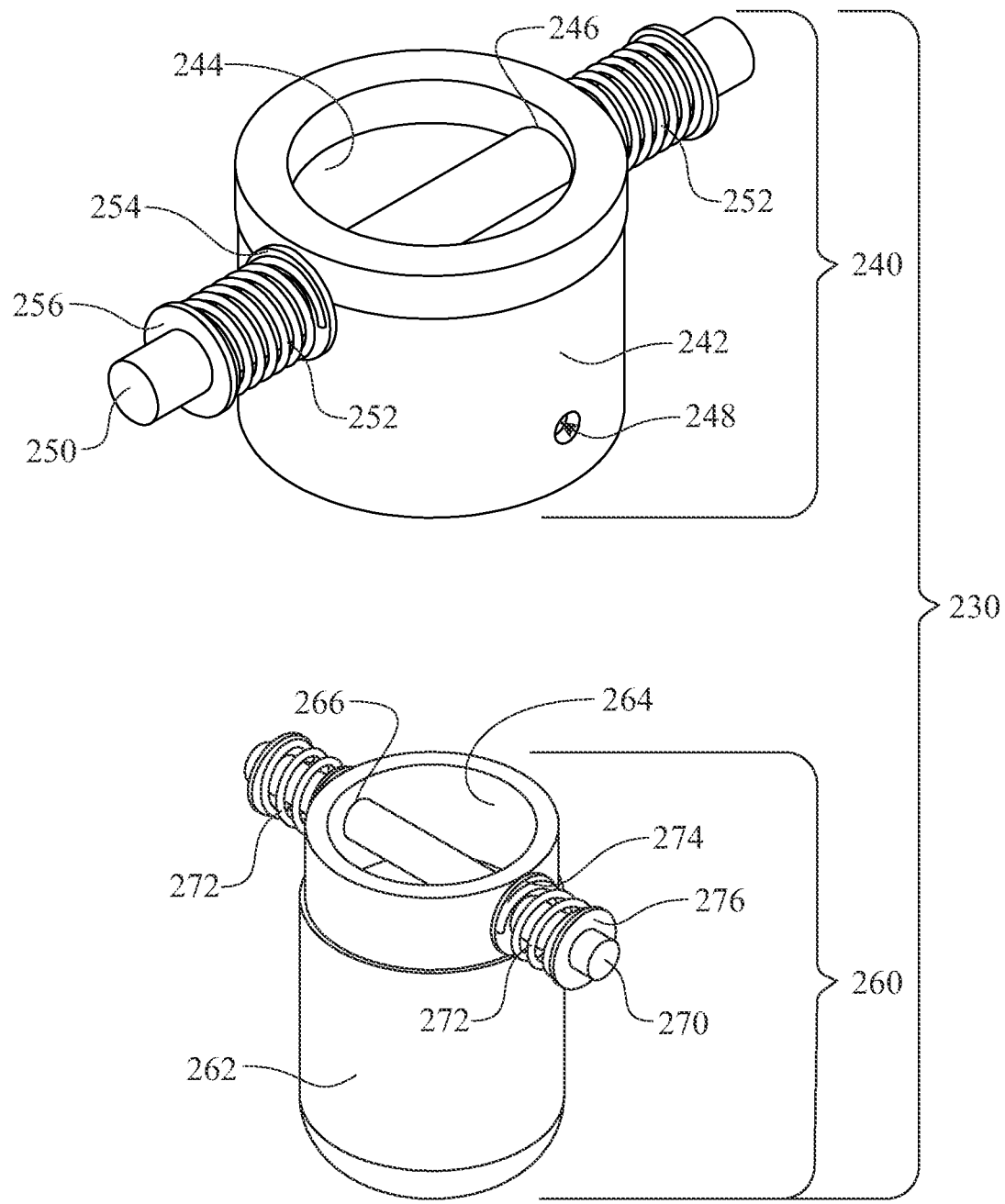
FIG. 9 presents an isometric partially exploded assembly view of a gimbal subassembly use for pivotally mounting the laser.
Figure 10:
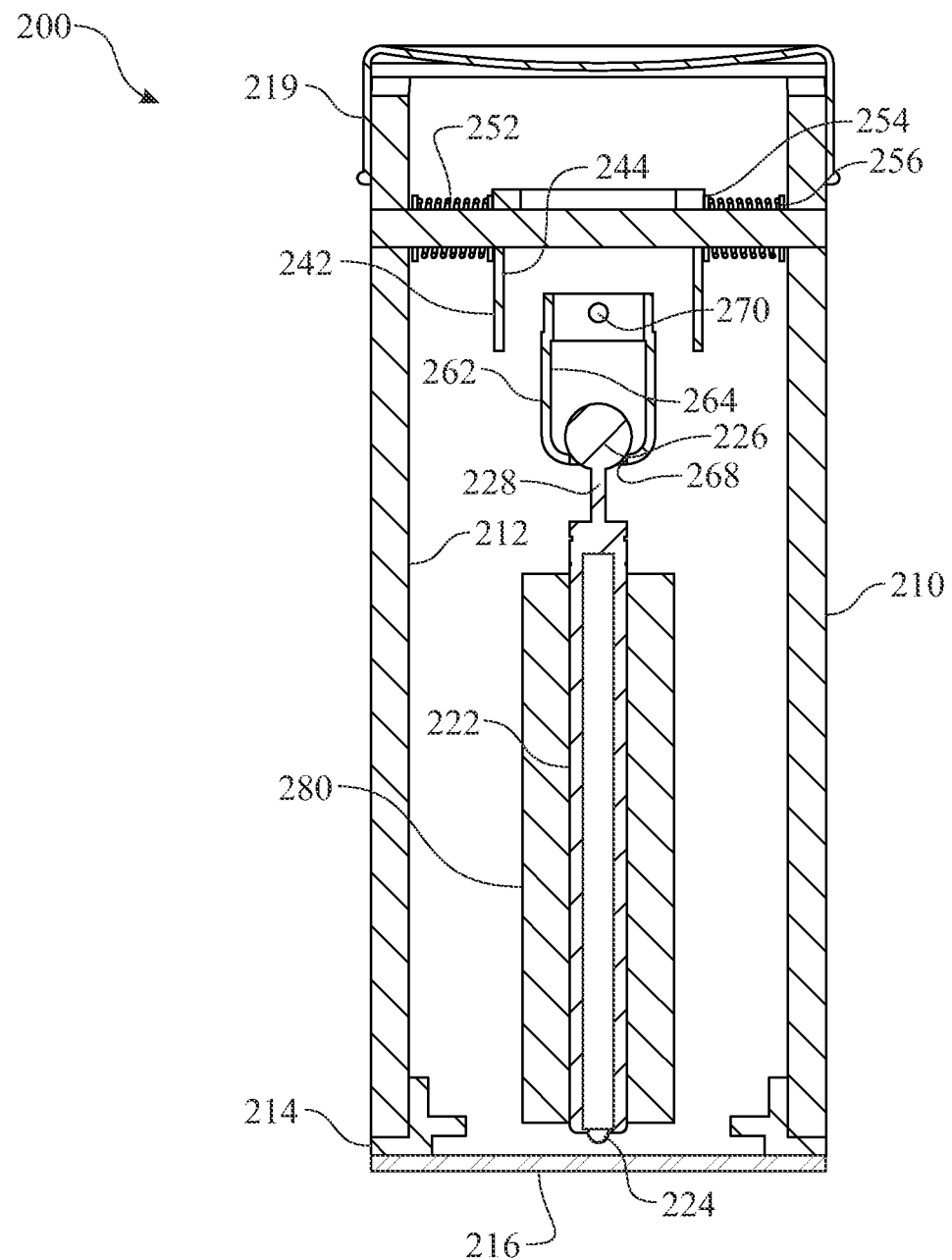
FIG. 10 presents a cross-sectional view of the laser guidance docking system, wherein the section is taken along section line 10-10 of FIG. 7.

The bi-directional gimbal assembly 230 includes a lower gimbal subassembly 260 pivotally assembled to an upper gimbal subassembly 240 by a lower gimbal body mounting axle 270. The upper gimbal subassembly 240 is pivotally assembled to the laser tubular enclosure 210 by an upper gimbal body mounting axle 250. The upper gimbal body mounting axle 250 is preferably oriented at a right angle to the lower gimbal body mounting axle 270, providing a bi-directional gimbal motion of the bi-directional gimbal assembly 230. The upper gimbal subassembly 240 includes an upper gimbal body 242 formed comprising a central passageway extending longitudinally therethrough, wherein the central passageway is defined by an upper gimbal body interior surface 244. A pair of upper gimbal pivot axle mounting apertures 246 is drilled along a diameter passing through an upper sidewall region of the upper gimbal body 242 for passage of an upper gimbal body mounting axle 250 therethrough. The upper gimbal body mounting axle 250 is assembled to the upper gimbal body 242 by passing the upper gimbal body mounting axle 250 through the pair of upper gimbal pivot axle mounting apertures 246. The upper gimbal body mounting axle 250 pivotally assembles the upper gimbal body 242 to the laser tubular enclosure 210 by passing the upper gimbal body mounting axle 250 through a respective aperture drilled along a diameter and passing through the laser tubular enclosure 210. The upper gimbal body 242 is retained in a centralized position within an interior of the laser tubular enclosure 210 by assembling an upper gimbal body mounting biasing member 252 onto each end segment of the upper gimbal body mounting axle 250 extending outward from the upper gimbal body 242. Each upper gimbal body mounting biasing member 252 is retained in compression by a respective upper gimbal body mounting inner washer 254 placed against an outer surface of the upper gimbal body 242 and a respective upper gimbal body mounting outer washer 256 placed against a tubular enclosure interior wall 212 of the laser tubular enclosure 210 as best illustrated in FIG. 7. The resulting assembly retains the upper gimbal body 242 centered within the laser tubular enclosure 210.

A pair of lower gimbal mounting apertures 248 is drilled along a diameter and passing through a lower sidewall region of the upper gimbal body 242 for assembly of the lower gimbal subassembly 260.

Figure 11:
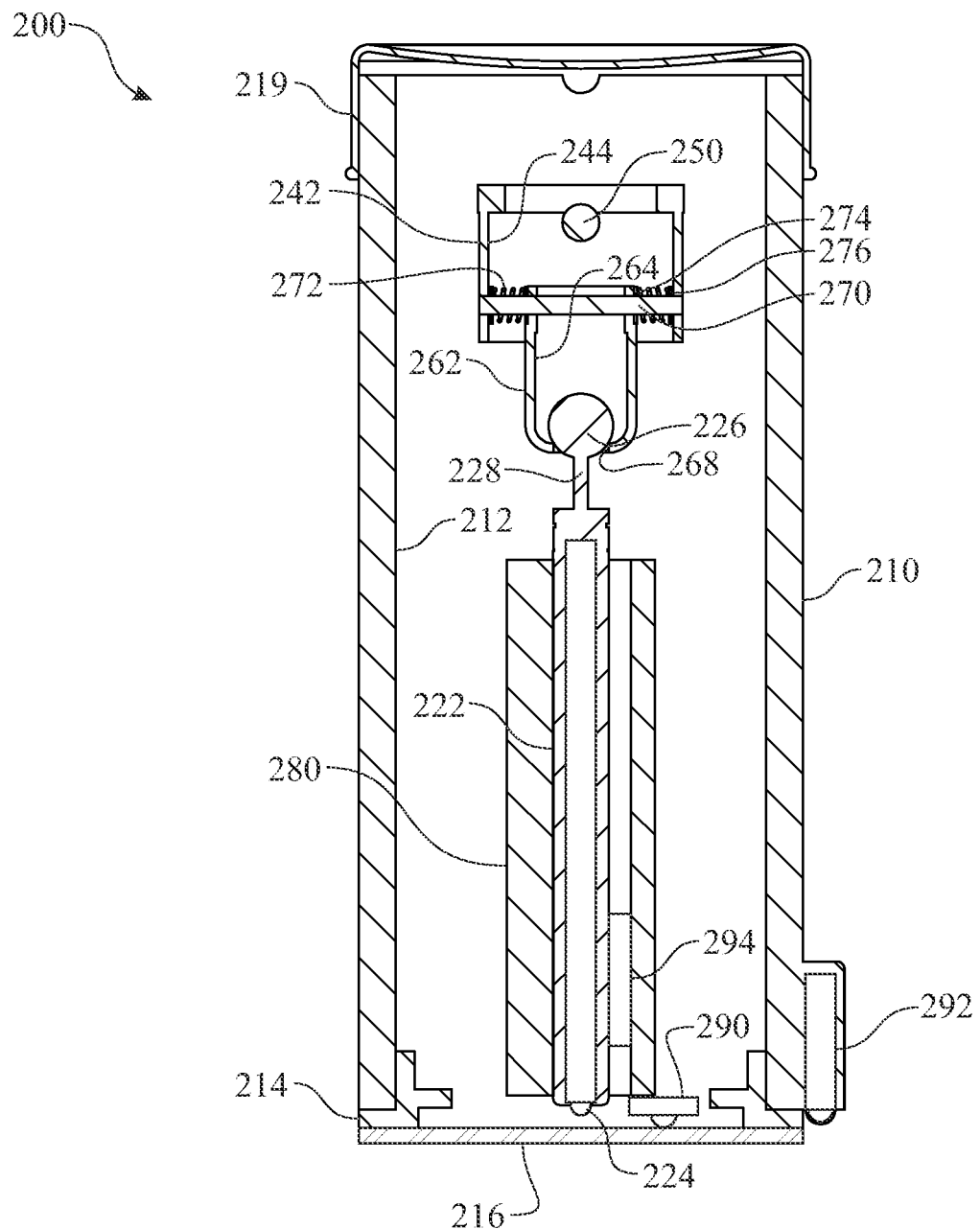
FIG. 11 presents a cross-sectional view of the laser guidance docking system, wherein the section is taken along section line 11-11 of FIG. 7.
Figure 12:
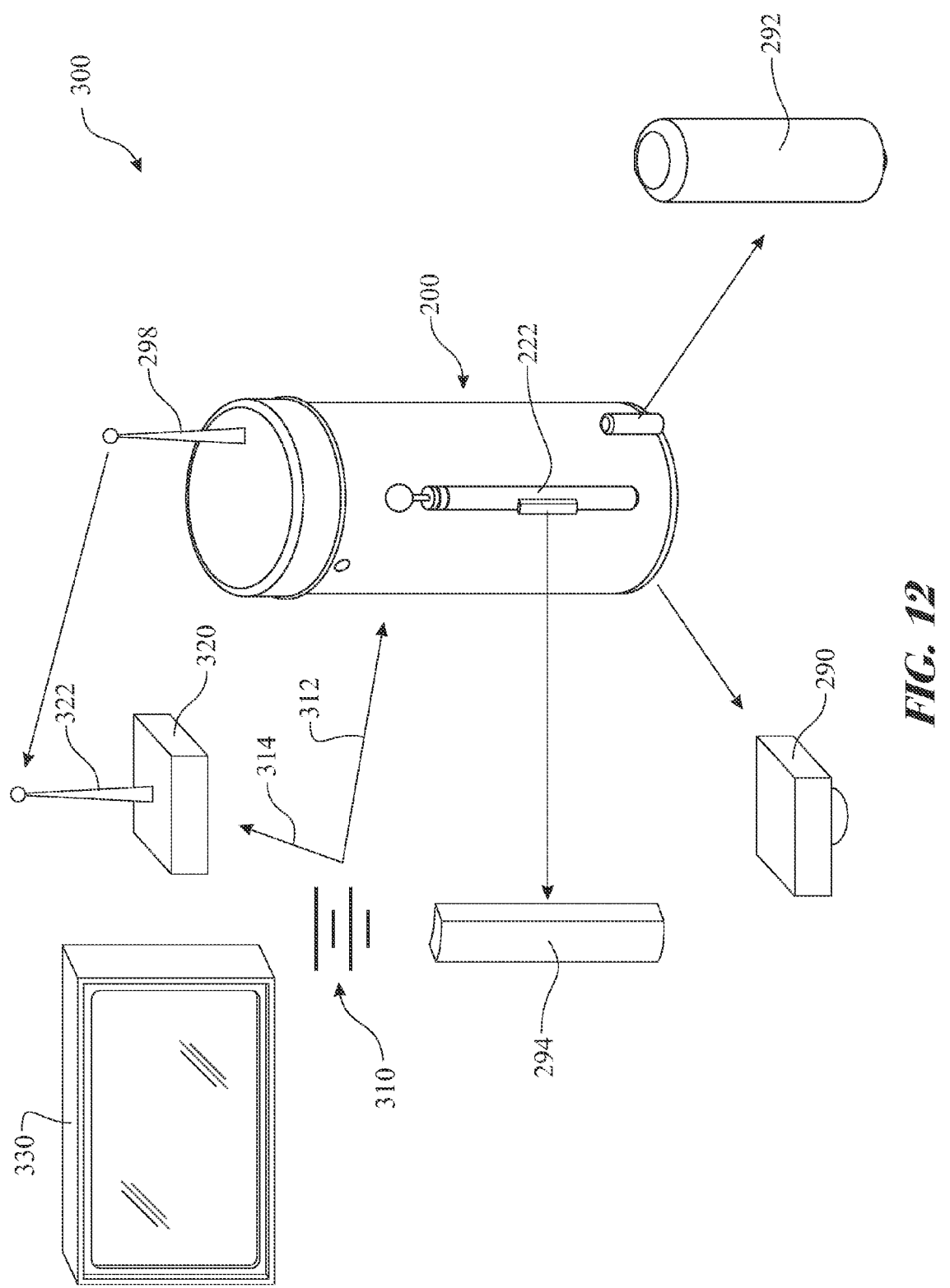
FIG. 12 presents an isometric system diagram of an exemplary enhanced laser guidance docking system.
Figures 13, 14:
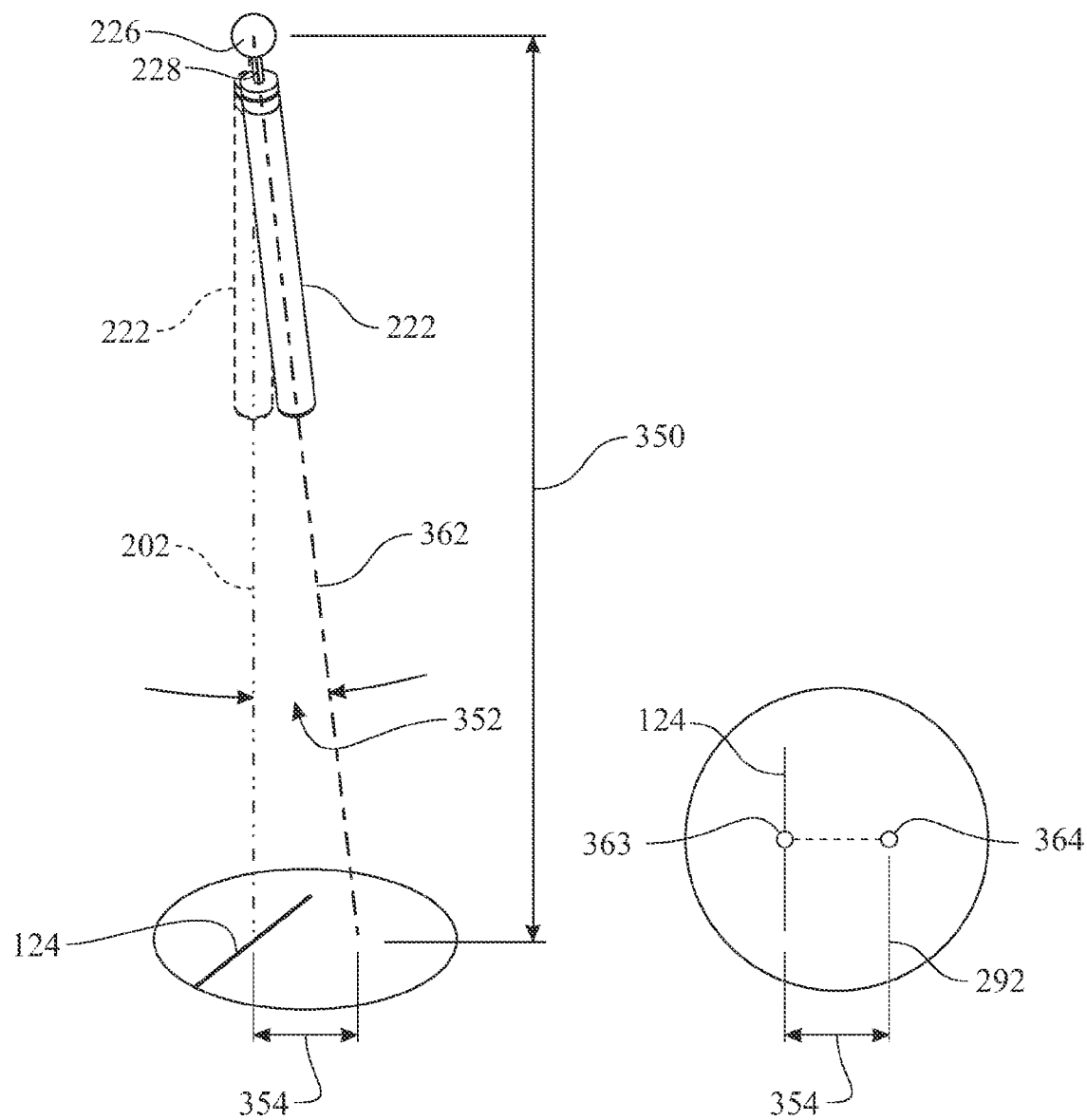
FIG. 13 presents an isometric view of the laser exhibiting a vertical angular offset, wherein the illustration presents a method of correcting a vertical angular offset of the laser.
FIG. 14 presents a plan view illustrating an offset resulting from the vertical angular offset of the laser.
Figure 15:
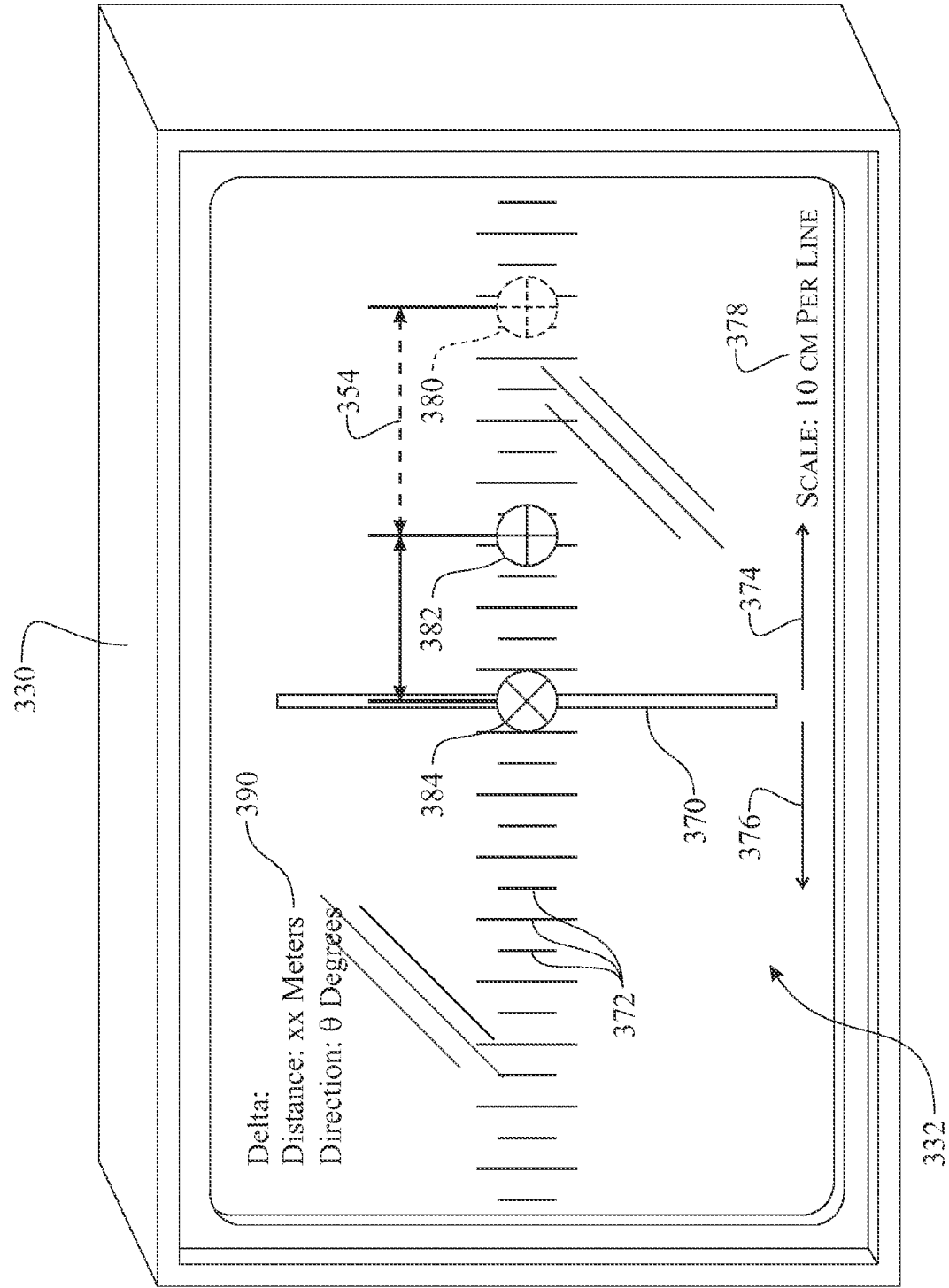
FIG. 15 presents an isometric view of an exemplary visual display, wherein the display is presenting an exemplary laser beam location correction.

The lower gimbal subassembly 260 includes a lower gimbal body 262 formed comprising a central passageway extending longitudinally therethrough, wherein the central passageway is defined by a lower gimbal body interior surface 264; the central passageway terminating at a curved lower section comprising a ball mount aperture 268 passing therethrough. A pair of lower gimbal pivot axle mounting apertures 266 is drilled along a diameter passing through an upper sidewall region of the lower gimbal body 262 for passage of a lower gimbal body mounting axle 270 therethrough. The lower gimbal body mounting axle 270 is assembled to the lower gimbal body 262 by passing the lower gimbal body mounting axle 270 through the pair of lower gimbal pivot axle mounting apertures 266. The lower gimbal body mounting axle 270 pivotally assembles the lower gimbal body 262 to the upper gimbal body 242 by passing the lower gimbal body mounting axle 270 through a lower gimbal mounting aperture 248 drilled along a diameter and passing through the upper gimbal body 242. The lower gimbal body 262 is retained in a centralized position within an interior of the upper gimbal body 242 by assembling a lower gimbal body mounting biasing member 272 onto each end segment of the lower gimbal body mounting axle 270 extending outward from the lower gimbal body 262. Each lower gimbal body mounting biasing member 272 is retained in compression by a respective lower gimbal body mounting inner washer 274 placed against an outer surface of the lower gimbal body 262 and a respective lower gimbal body mounting outer washer 276 placed against a upper gimbal body interior surface 244 of the upper gimbal body 242 as best illustrated in FIG. 11. The resulting assembly retains the lower gimbal body 262 centered within the upper gimbal body 242, and ultimately centered within the laser tubular enclosure 210.

The exemplary laser assembly 220 is pivotally assembled to the bi-directional gimbal assembly 230 by seating a ball mount 226 within the curved lower section of the lower gimbal body 262. The ball mount 226 is assembled to a laser unit 222 by a ball mount assembly post 228. The ball mount assembly post 228 provides sufficient distance between a lower region of the ball mount 226 and an upper region of the laser unit 222, enabling a desired additional pivotal motion. It is understood that the laser unit 222 can be assembled to the laser tubular enclosure 210 using either the ball mount 226 in conjunction with a curved mating mounting element, exclusive of the ball mount 226 and rigidly fixed to the lower gimbal body 262 of the bi-directional gimbal assembly 230, or a combination thereof.

A laser protecting impact absorbing member 280 is installed either about a peripheral surface of the laser unit 222, adhered to the tubular enclosure interior wall 212 of the laser tubular enclosure 210, or both to protect the laser unit 222 from damage during unwarranted motion, where the laser unit 222 can impact the tubular enclosure interior wall 212 of the laser tubular enclosure 210 as a result of any motion of the vessel 100. In the exemplary embodiment, the laser protecting impact absorbing member 280 includes a impact absorbing member central channel 282 sized and shaped to affix to an exterior surface of the laser unit 222. A impact absorbing member longitudinal slot 284 can be cut longitudinally along a length of the laser protecting impact absorbing member 280 to aid in assembling the laser protecting impact absorbing member 280 to the laser unit 222. The laser protecting impact absorbing member 280 can be retained against the laser unit 222 by any suitable method, including friction, adhesive, geometric interference, and the like. In an alternative embodiment, the laser protecting impact absorbing member 280 can be affixed to the tubular enclosure interior wall 212 of the laser tubular enclosure 210. The laser protecting impact absorbing member 280 would absorb any impact caused by the laser unit 222 swinging from motion of the vessel 100 to minimize or eliminate any potential for damage to the laser unit 222.

The weight of the laser unit 222 and freedom of motion provided by the combination of the bi-directional gimbal assembly 230 and the ball mount 226 retains the laser unit 222 in a substantially vertical orientation. A laser vertical angular reference device 294 and respective supporting equipment can be integrated into an enhanced vessel laser guidance docking system 300, as presented in the exemplary block diagram illustrated in FIGS. 12 through 15. Additionally, the enhanced vessel laser guidance docking system 300 enables a one person operation of the system, where an image of the relationship between the laser illuminated marking 204 and the respective alignment marker on the dock upper surface 122 is presented to the operational controlling officer of the vessel 100 on a system display 330.

The enhanced vessel laser guidance docking system 300 integrates a laser reference camera 290, a laser height measurement device 292 and the laser vertical angular reference device 294 into the vessel laser positioning system 200. The enhanced vessel laser guidance docking system 300 further integrates a system computing device 320 and a system display 330 therein. Power for operation of each of the devices can be provided by a power source 310. The preferred power source 310 would be one or more of the vessel's general electrical power distribution networks. Power is transferred from the power source 310 to the vessel laser positioning system 200 by a power conduit 312. Power is transferred from the power source 310 to the system computing device 320 by a power conduit 314. It is understood that the power source 310 can be any suitable power source, including any of the vessel's general electrical power distribution networks, one or more batteries, solar power, a self generating power system, a movement power generating system, and the like.

In operation, the laser reference camera 290 obtains a digital image of the relationship between the laser illuminated marking 204 and the respective alignment marker on the dock upper surface 122. The laser height measurement device 292 obtains data to determine a vertical distance between the pivotal center of the ball mount 226 and the dock upper surface 122 or other surface illuminated by the laser illuminated marking 204. The laser height measurement device 292 can determine either a vertical distance between the ball mount 226 and the dock upper surface 122 (a distance that would be parallel to the laser beam 202 of FIG. 13) or a linear distance between the ball mount 226 and the dock upper surface 122 depending upon the device selected (a distance that would be parallel to the angled laser beam 362 of FIG. 13). The laser vertical angular reference device 294 determines a vertical angular relation 352, wherein the vertical angular relation 352 can include an angle and a direction of the angular relation between the laser unit 222 and a vertical orientation. Data obtained by each of the laser reference camera 290, the laser height measurement device 292 and the laser vertical angular reference device 294 is transferred to a system computing device 320 using either a wired or wireless communication (represented by a wireless laser data transmitter 298 and a wireless laser data receiver 322 illustrated in FIG. 12). A resulting horizontal offset 354 can be calculated using the vertical distance 350 and the vertical angular relation 352 in conjunction with common geometric formulas.

A combination of known parameters of camera used to obtain the digital image and the determined vertical height can be used to calculate a dimension between the target marking 124, 128 on the dock upper surface 122 and the laser illuminated marking 204. The calculated horizontal offset 354 can be considered to determine the corrected laser illumination position or what would be the vertically generated laser marker location 363 when the laser 222 is in a vertical orientation.

The collected data can be processed by the system computing device 320 to present an image upon a displayed image 332 of the system display 330. The exemplary image illustrated in FIG. 15 further demonstrates the capabilities and affect of the offset correction process. The image presents a dock alignment marker 370, a distance scale 372, a forward motion reference 374 an aft motion reference 376, and a scale 378 as references for guiding the vessel's operational officer. The dock alignment marker 370 and distance scale 372 would remain fixed during the docking process. The display would present a corrected laser illumination image 382 at a representative location respective to the dock alignment marker 370. The location of the corrected laser illumination image 382 respective to the dock alignment marker 370 would be determined from the data collected by the laser reference camera 290, laser height measurement device 292 and laser vertical angular reference device 294. The illustration presents the actual laser illumination image 380 as originally obtained by the laser reference camera 290 and the resulting horizontal offset 354 calculated using the data collected by the laser reference camera 290, laser height measurement device 292 and laser vertical angular reference device 294. The system can calculate and display a quantified guidance output 390, wherein the quantified guidance output 390 can include a distance to the final position and a respective direction of travel required. The displayed image can optionally include an actual laser illumination image 380 and/or a target laser illumination image 384 if desired. The display can be programmable, enabling the user with the ability to view or conceal the actual laser illumination image 380 and/or the target laser illumination image 384. The system can include an option enabling the user to selectively display or conceal the quantified guidance output 390. The system can enable the user to selectively control the scale, select the units of measure, and the like.

Although the exemplary embodiment presents a combination of the ball mount 226 and the bi-directional gimbal assembly 230 mounted within the laser tubular enclosure 210, it is understood that any structure or system known by those skilled in the art can be employed to retain the laser unit 222 in a vertical orientation. One suggested alternative would be an active vertical retention system using a series of mechanical devices to retain the laser unit 222 in a vertical orientation. Another alternative configuration would affix the laser unit 222 within the enclosure and the vertical orienting elements would retain the enclosure in a vertical orientation.

Although the exemplary embodiments orient the laser beam 202 vertically, it is understood that the vessel laser positioning system 200 can be modified to orient the laser beam 202 horizontally to work in conjunction with a vertically oriented reference on the dock platform 120.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

| Element Description References | |
|---|---|
| Ref. No. | Description |
| 100 | vessel |
| 102 | vessel hull |
| 104 | vessel superstructure |
| 106 | vessel bridge |
| 107 | bridge wing glass floor |
| 108 | bridge wing |
| 109 | extended bridge wing |
| 110 | fore motion |
| 112 | aft motion |
| 120 | dock platform |
| 121 | dock supporting structure |
| 122 | dock upper surface |
| 124 | alignment marker |
| 126 | alignment marker reference |
| 128 | location reference object |
| 130 | positioning system mount |

-continued

| Ref. No. | Description |
| --- | --- |
| 199 | body of water |
| 200 | vessel laser positioning system |
| 202 | laser beam |
| 204 | laser illuminated marking |
| 210 | laser tubular enclosure |
| 212 | tubular enclosure interior wall |
| 214 | enclosure lower seal |
| 216 | enclosure laser window |
| 218 | lower seal central aperture |
| 219 | enclosure upper seal |
| 220 | laser assembly |
| 222 | laser unit |
| 224 | laser lens |
| 226 | ball mount |
| 228 | ball mount assembly post |
| 230 | bi-directional gimbal assembly |
| 240 | upper gimbal subassembly |
| 242 | upper gimbal body |
| 244 | upper gimbal body interior surface |
| 246 | upper gimbal pivot axle mounting aperture |
| 248 | lower gimbal mounting aperture |
| 250 | upper gimbal body mounting axle |
| 252 | upper gimbal body mounting biasing member |
| 254 | upper gimbal body mounting inner washer |
| 256 | upper gimbal body mounting outer washer |
| 260 | lower gimbal subassembly |
| 262 | lower gimbal body |
| 264 | lower gimbal body interior surface |
| 266 | lower gimbal pivot axle mounting aperture |
| 268 | ball mount aperture |
| 270 | lower gimbal body mounting axle |
| 272 | lower gimbal body mounting biasing member |
| 274 | lower gimbal body mounting inner washer |
| 276 | lower gimbal body mounting outer washer |
| 280 | laser protecting impact absorbing member |
| 282 | impact absorbing member central channel |
| 284 | impact absorbing member longitudinal slot |
| 290 | laser reference camera |
| 292 | laser height measurement device |
| 294 | laser vertical angle reference device |
| 298 | wireless laser data transmitter |
| 300 | enhanced vessel laser guidance docking system |
| 310 | power source |
| 312 | power conduit |
| 314 | power conduit |
| 320 | system computing device |
| 322 | wireless laser data receiver |
| 330 | system display |
| 332 | displayed image |
| 350 | vertical distance |
| 352 | vertical angular relation |
| 354 | resulting horizontal offset |
| 362 | angled laser beam |
| 363 | vertically generated laser marker location |
| 364 | vertically offset generated laser marker location |
| 370 | dock alignment marker |
| 372 | distance scale |
| 374 | forward motion reference |
| 376 | aft motion reference |
| 378 | scale |
| 380 | actual laser illumination image |
| 382 | corrected laser illumination image |
| 384 | target laser illumination image |
| 390 | quantified guidance output |

What is claimed is:

1. A method of properly positioning a vessel longitudinally along a dock, the method comprising steps of:
   directing a guidance laser towards a dock, wherein the laser is located at a predetermined position on the vessel and the dock comprises one of:
   an alignment marking,
   a series of alignment markings, and
   an alignment object;
   determining a target marking, wherein the target marking is selected from one of the an alignment marking, the series of alignment markings, and the alignment object and the target marking is a reference location used in conjunction with a guidance laser illuminated point to position the vessel in the proper longitudinal position along the dock;
   emitting a guidance laser beam from the guidance laser, wherein the guidance laser beam is directed in a generally downward direction; and
   propelling the ship longitudinally along the dock until the guidance laser illuminated point generated by an end of a guidance laser beam generated by the guidance laser aligns with the target marking.

2. A method of properly positioning a vessel longitudinally along a dock as recited in claim 1, the method further comprising a step of:
   retaining the laser in a substantially vertical orientation.

3. A method of properly positioning a vessel longitudinally along a dock as recited in claim 1, wherein the laser is pivotally attached to a laser supporting device and the method further comprising a step of:
   retaining the laser in a substantially vertical orientation by utilizing a weight of the laser to draw the laser into the substantially vertical orientation.

4. A method of properly positioning a vessel longitudinally along a dock as recited in claim 1, the method further comprising a step of:
   calculating a horizontal offset of the illuminated point from the actual illuminated point to one that compensates for a vertical angular offset of the laser.

5. A method of properly positioning a vessel longitudinally along a dock as recited in claim 1, the method further comprising a step of:
   determining one of a vertical dimension between the laser and the upper surface of the dock and a longitudinal axial distance between the laser and the upper surface of the dock;
   determining a laser angle respective to vertical;
   calculating a horizontal offset of the illuminated point from the actual illuminated point to one that compensates for a vertical angular offset of the laser, wherein the calculations utilize the following:
   one of a vertical dimension between the laser and the upper surface of the dock and a longitudinal axial distance between the laser and the upper surface of the dock, and
   the laser angle respective to vertical; and
   conveying the calculated horizontal offset to an individual.

6. A method of properly positioning a vessel longitudinally along a dock as recited in claim 5, the method further comprising a step of:
   determining a corrected laser illuminated point by adjusting the actual illuminated point by the calculated horizontal offset; and
   presenting a representative image illustrating a relation between the corrected laser illuminated point and the target marking on a remote display.

7. A method of properly positioning a vessel longitudinally along a dock as recited in claim 1, the method further comprising a step of:
   obtaining a digital image of the laser illuminated marking and the target marking;
   determining a vertical dimension between the laser and the upper surface of the dock;
   calculating a horizontal distance between the target marking and the laser illuminated marking;

conveying the calculated distance between the target marking and the laser illuminated marking to an individual.

8. A method of properly positioning a vessel longitudinally along a dock, the method comprising steps of:
   directing a guidance laser towards a dock, wherein the laser is located at a predetermined position on the vessel and the dock comprises one of:
   an alignment marking,
   a series of alignment markings, and
   an alignment object;
   determining a target marking, wherein the target marking is selected from one of the an alignment marking, the series of alignment markings, and the alignment object and the target marking is a reference location used in conjunction with a guidance laser illuminated point to position the vessel in the proper longitudinal position along the dock;
   emitting a guidance laser beam from the guidance laser, wherein the guidance laser beam is directed in a generally downward direction;
   obtaining a digital image of the target marking and the guidance laser illuminated point;
   displaying one of the following on a remote display:
   the digital image of the target marking and the guidance laser illuminated point, and
   a representation of the digital image of the target marking and the guidance laser illuminated point; and
   propelling the ship longitudinally along the dock until the guidance laser illuminated point generated by an end of a guidance laser beam generated by the guidance laser aligns with the target marking.

9. A method of properly positioning a vessel longitudinally along a dock as recited in claim 8, the method further comprising a step of:
   retaining the laser in a substantially vertical orientation.

10. A method of properly positioning a vessel longitudinally along a dock as recited in claim 8, wherein the laser is pivotally attached to a laser supporting device and the method further comprising a step of:
    retaining the laser in a substantially vertical orientation by utilizing a weight of the laser to draw the laser into the substantially vertical orientation.

11. A method of properly positioning a vessel longitudinally along a dock as recited in claim 8, the method further comprising a step of:
    calculating a horizontal offset of the illuminated point from the actual illuminated point to one that compensates for a vertical angular offset of the laser.

12. A method of properly positioning a vessel longitudinally along a dock as recited in claim 8, the method further comprising a step of:
    determining one of a vertical dimension between the laser and the upper surface of the dock and a longitudinal axial distance between the laser and the upper surface of the dock;
    determining a laser angle respective to vertical;
    calculating a horizontal offset of the illuminated point from the actual illuminated point to one that compensates for a vertical angular offset of the laser, wherein the calculations utilize the following:
    one of a vertical dimension between the laser and the upper surface of the dock and a longitudinal axial distance between the laser and the upper surface of the dock, and
    the laser angle respective to vertical; and
    conveying the calculated horizontal offset to an individual by presenting the information on the remote display.

13. A method of properly positioning a vessel longitudinally along a dock as recited in claim 12, the method further comprising a step of:
    determining a corrected laser illuminated point by adjusting the actual illuminated point by the calculated horizontal offset; and
    presenting a representative image illustrating a relation between the corrected laser illuminated point and the target marking on the remote display.

14. A method of properly positioning a vessel longitudinally along a dock as recited in claim 8, the method further comprising a step of:
    determining a vertical dimension between the laser and the upper surface of the dock;
    calculating a horizontal distance between the target marking and the laser illuminated marking;
    presenting the calculated distance between the target marking and the laser illuminated marking on the remote display.

15. A method of properly positioning a vessel longitudinally along a dock, the method comprising steps of:
    positioning a guidance laser on a vessel in accordance with one of:
    mounting the guidance laser extending outward from a side portion of a ship, and
    locating the guidance laser above a transparent section of a bridge wing floor;
    directing a guidance laser towards a dock, wherein the laser is located at a predetermined position on the vessel and the dock comprises one of:
    an alignment marking,
    a series of alignment markings, and
    an alignment object;
    determining a target marking, wherein the target marking is selected from one of the an alignment marking, the series of alignment markings, and the alignment object and the target marking is a reference location used in conjunction with a guidance laser illuminated point to position the vessel in the proper longitudinal position along the dock;
    emitting a guidance laser beam from the guidance laser, wherein the guidance laser beam is directed in a generally downward direction; and
    propelling the ship longitudinally along the dock until the guidance laser illuminated point generated by an end of a guidance laser beam generated by the guidance laser aligns with the target marking.

16. A method of properly positioning a vessel longitudinally along a dock as recited in claim 15, the method further comprising a step of:
    retaining the laser in a substantially vertical orientation.

17. A method of properly positioning a vessel longitudinally along a dock as recited in claim 15, the method further comprising a step of:
    calculating a horizontal offset of the illuminated point from the actual illuminated point to one that compensates for a vertical angular offset of the laser.

18. A method of properly positioning a vessel longitudinally along a dock as recited in claim 15, the method further comprising a step of:
    determining one of a vertical dimension between the laser and the upper surface of the dock and a longitudinal axial distance between the laser and the upper surface of the dock;
    determining a laser angle respective to vertical;
    calculating a horizontal offset of the illuminated point from the actual illuminated point to one that compensates for a vertical angular offset of the laser, wherein the calculations utilize the following:
one of a vertical dimension between the laser and the upper surface of the dock and a longitudinal axial distance between the laser and the upper surface of the dock, and
the laser angle respective to vertical; and
conveying the calculated horizontal offset to an individual.

19. A method of properly positioning a vessel longitudinally along a dock as recited in claim 18, the method further comprising a step of:
determining a corrected laser illuminated point by adjusting the actual illuminated point by the calculated horizontal offset; and
presenting a representative image illustrating a relation between the corrected laser illuminated point and the target marking on a remote display.

20. A method of properly positioning a vessel longitudinally along a dock as recited in claim 15, the method further comprising a step of:
obtaining a digital image of the laser illuminated marking and the target marking;
determining a vertical dimension between the laser and the upper surface of the dock;
calculating a horizontal distance between the target marking and the laser illuminated marking;
conveying the calculated distance between the target marking and the laser illuminated marking to an individual.

* * * * *